(12) United States Patent
Lim

(10) Patent No.: US 9,203,688 B2
(45) Date of Patent: Dec. 1, 2015

(54) VOIP SERVICE SYSTEM USING NAT AND METHOD OF PROCESSING PACKET THEREIN

(75) Inventor: Pyung-Bin Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1485 days.

(21) Appl. No.: 11/984,306

(22) Filed: Nov. 15, 2007

(65) Prior Publication Data

US 2008/0151875 A1 Jun. 26, 2008

(30) Foreign Application Priority Data

Dec. 22, 2006 (KR) ........................ 10-2006-0132894

(51) Int. Cl.
*H04L 12/66* (2006.01)
*H04L 12/56* (2006.01)
*H04L 29/12* (2006.01)

(52) U.S. Cl.
CPC ........ *H04L 29/12377* (2013.01); *H04L 29/125* (2013.01); *H04L 61/2517* (2013.01); *H04L 61/2564* (2013.01)

(58) Field of Classification Search
CPC ..................... H04L 29/12377; H04L 61/2564; H04L 61/2517
USPC .......................... 370/352–356, 349, 389, 392
See application file for complete search history.

(56) References Cited

U.S. PATENT DOCUMENTS

| | | | |
|---|---|---|---|
| 6,331,984 B1 * | 12/2001 | Luciani | 370/401 |
| 6,822,957 B1 * | 11/2004 | Schuster et al. | 370/389 |
| 7,447,804 B2 * | 11/2008 | Koo | 709/249 |
| 7,450,564 B2 | 11/2008 | Han | |
| 7,814,175 B1 * | 10/2010 | Chang et al. | 709/219 |
| 2003/0219011 A1 * | 11/2003 | Han | 370/352 |
| 2006/0136716 A1 * | 6/2006 | Cho et al. | 713/151 |
| 2006/0140174 A1 * | 6/2006 | Yeom | 370/352 |
| 2006/0193323 A1 | 8/2006 | Lee | |

(Continued)

FOREIGN PATENT DOCUMENTS

| | | |
|---|---|---|
| KR | 10-2003-0091001 | 12/2003 |
| KR | 1020060028975 | 4/2006 |
| KR | 1020060095244 | 8/2006 |

OTHER PUBLICATIONS

Korean Intellectual Property Office Notice of Decision to Grant Patent dated Feb. 8, 2013 for KR Application No. 10-2006-0132894.

*Primary Examiner* — Asad Nawaz
*Assistant Examiner* — Syed Ali
(74) *Attorney, Agent, or Firm* — H.C. Park & Associates, PLC

(57) ABSTRACT

A Voice over Internet Protocol (VoIP) service system using Network Address Translation (NAT) and a method of processing a packet in the system. The method includes the steps of: looking up a private address of a terminal located behind a NAT device in a previously generated NAT table using port information included in a packet transferred from a terminal located outside the NAT device to the terminal located behind the NAT device; and when a packet is transferred from the terminal located behind the NAT device to the terminal located outside the NAT device, generating an IP conntrack having the private address of the terminal located behind the NAT device as an originating address and having a public address of the terminal located outside the NAT device as a destination address.

12 Claims, 9 Drawing Sheets

(56) References Cited

U.S. PATENT DOCUMENTS

| | | | |
|---|---|---|---|
| 2006/0268890 A1* | 11/2006 | Richardson et al. | 370/395.3 |
| 2007/0180081 A1* | 8/2007 | Okmianski et al. | 709/223 |
| 2007/0195800 A1* | 8/2007 | Yang et al. | 370/401 |
| 2008/0151875 A1* | 6/2008 | Lim | 370/352 |
| 2009/0215438 A1* | 8/2009 | Mittal et al. | 455/418 |

* cited by examiner

FIG. 2 udp      17  28  src=165.213.109.217 dst=165.213.88.194 sport=6000 dport=6000
[UNREPLIED] src=165.213.88.194 dst=165.213.109.217 sport=6000 dport=6000 use=1

FIG. 4 udp     17 28 src=165.213.109.217 dst=165.213.88.194 sport=6000 dport=6000
src=10.0.2.2 dst=165.213.109.217 sport=6000 dport=6000 [ASSURED] use=1

| | Data | |
|---|---|---|
| ○△ Administrator | Network I Firewall I Port I Layer2 I Layer3 I IPMC I QoS I Status I VPN I IDS I VoIP_Service I System | |

DHCP Server Configuration

| Interface | Sub Network | Broadcast | Router | Default Lease Time |
|---|---|---|---|---|
| eth2 | 10.0.2.0 — 60 | 10.0.2.255 | 10.0.2.1 | 11111 |

| Server | IP | Gateway | Netmask | MAC/Host ID | |
|---|---|---|---|---|---|
| CALL | 10.0.2.2 | 10.0.2.1 | 255.255.255.0 | HOST ▽ | SME_MCP |
| FEATURE | | | | NONE ▽ | |

| Cards | IP | Start Port | Gateway | Netmask |
|---|---|---|---|---|
| ☑ Slots Select — 61 | | | | |
| 1-1 ☐ | | | | |
| 1-2 ☐ | | | | |
| 1-3 ☑ | 10.0.2.3 | 20000 | 10.0.2.1 | 255.255.255.0 |
| 1-4 ☐ | | | | |
| 1-5 ☐ | | | | |
| 2-1 ☐ | | | | |
| 2-2 ☐ | | | | |
| 2-3 ☐ | | | | |
| 2-4 ☐ | | | | |
| 2-5 ☐ | | | | |

| | SIP Phone IP Range | Gateway | Netmask | MAC/Host ID | |
|---|---|---|---|---|---|
| POOL | 10.0.2.4 ~ 10 | 10.0.2.1 | 255.255.255.0 | NONE ▽ | List ☐ |

VoIP Service
- ⊟ DSMI Configuration
  - SM Interface
  - Module Interface Management
- ⊟ External Service
  - External FS
  - DIST config
- ⊟ DHCP Server
  - ▷ Configuration Management
  - VoIP Status
  - Leases Status
- ⊟ DHCP Relay Agent
  - Configuration Management
- ⊟ VoIP NAPT
  - Status
- ⊟ SIP ALG
  - Configuration Management

FIG. 8

NAPT Chain for VoIP

```
Chain VOIP_FORWARD (1 references)
target     prot opt source       destination
ACCEPT     tcp  --  0.0.0.0/0    10.0.0.2      tcp dpt:1719
ACCEPT     tcp  --  0.0.0.0/0    10.0.0.2      tcp dpt:1720
ACCEPT     udp  --  0.0.0.0/0    10.0.0.2      udp dpt:1719
ACCEPT     udp  --  0.0.0.0/0    10.0.0.2      udp dpt:1720
ACCEPT     tcp  --  0.0.0.0/0    10.0.0.2      tcp dpt:5060
ACCEPT     udp  --  0.0.0.0/0    10.0.0.2      udp dpt:5060
ACCEPT     udp  --  0.0.0.0/0    10.0.0.3      udp dpts:30000:30031
ACCEPT     tcp  --  0.0.0.0/0    10.0.0.2      tcp dpt:6100
ACCEPT     tcp  --  0.0.0.0/0    10.0.0.2      tcp dpt:6000
ACCEPT     udp  --  0.0.0.0/0    10.0.0.2      udp dpt:6000
ACCEPT     udp  --  0.0.0.0/0    10.0.0.2      udp dpt:9000
ACCEPT     tcp  --  0.0.0.0/0    10.0.0.2      tcp dpt:5000
```

VOIP SERVICE SYSTEM USING NAT AND METHOD OF PROCESSING PACKET THEREIN

CLAIM OF PRIORITY

This application makes reference to, incorporates the same herein, and claims all benefits accruing under 35 U.S.C. §119 from an application for VoIP SER VICE SYSTEM USING NAT AND METHOD OF PROCESSING PACKET THEREIN earlier filled in the Korean Intellectual Property Office on 22 Dec. 2006 and there duly assigned Serial No. 2006-132894.

BACKGROUND OF THE INVENTION

1. Field of the Invention

The present invention relates to a Voice over Internet Protocol (VoIP) service system using Network Address Translation (NAT) and a method of processing a packet in the system, and more particularly, to a VoIP service system normally transferring a packet from a terminal located outside a NAT device to a terminal located behind the NAT device using an IP conntrack generated to transfer a packet for VoIP service between a terminal located outside the NAT device and a terminal located behind the NAT device, and a method of processing a packet in the system.

2. Description of the Related Art

VoIP refers to Internet telephone technology for a series of devices that transfer voice information using an IP. VoIP is not based on a line, as a Public Switched Telephone Network (PSTN) is, but transfers voice information in discontinuous packets in digital form.

Internet telephone technology's main advantage is that it implements integrated voice communication service using a conventional IP network as is, and thereby allows telephone users to receive long distance and international call services in the Internet and intranet environments at a local call rate.

Signaling protocols for implementing VoIP are H.323, a Session Initiation Protocol (SIP), a Media Gateway Control Protocol (MGCP), and so on. Currently, the SIP that is an application layer control protocol based on a simple text has been widely commercialized.

Meanwhile, NAT is defined in Requests For Comments (RFC) 3022 as a translation technique that translates a private address into a public address or vice versa. Such a NAT device, e.g., a router, makes an internal zone behind the NAT device using a private address and an external zone outside the NAT device using a public address correspond to each other. And, the NAT technique does not externally expose a network behind the NAT device, thus having a security effect also.

Such a NAT technique allows terminals that are located in private networks due to the exhaustion of Internet Protocol version 4 (IPv4) addresses, to access the Internet.

In addition, the NAT device, e.g., a router, changes a port number using a Network Address Ports Translation (NAPT) table so that a plurality of terminals can communicate with each other using one public address, thereby distinguishing communication performed between the terminals.

The development of network technology is leading to the development of a gateway that transfers voice information between terminals located in private networks and terminals connected with the Internet.

Such a gateway must have a NAT or NAPT function and a VoIP service function to transfer voice information between terminals located in private networks and terminals connected with the Internet.

A gateway must have a NAT table to provide VoIP service between terminals located in a private network and terminals connected with the Internet. Here, NAT configuration may be made by an administrator, or automatically made when the gateway is installed. The former is a manual configuration method, and the latter is an automatic configuration method.

Meanwhile, when a packet is transferred from a terminal connected with the Internet to a terminal located in a private network, a gateway generates an IP conntrack using information included in the transferred packet to transfer the packet from the terminal located in a private network to the terminal connected with the Internet. It should be noted here that the known phrase IP conntrack is associated with connection tracking and is not equivalent to the known phrase IP address.

SUMMARY OF THE INVENTION

It is an object of the present invention to provide a Voice over Internet Protocol (VoIP) service system normally transferring a packet for VoIP service from a terminal located outside a Network Address Translation (NAT) device to a terminal located behind the NAT device using an IP conntrack generated when a packet for VoIP service is transferred between a terminal located outside the NAT device and a terminal located behind the NAT device, and a method of processing a packet in the system.

A first aspect of the present invention provides a VoIP service system using NAT, comprising: a router for looking up a private address of a terminal located behind a NAT device in a previously generated NAT table using port information included in a packet transferred from a terminal located outside the NAT device to the terminal located behind the NAT device, and when a packet is transferred from the terminal located behind the NAT device to the terminal located outside the NAT device, the router generates an IP conntrack having the private address of the terminal located behind the NAT device as an originating address and a public address of the terminal located outside the NAT device as a destination address.

The router may change the originating address of the packet, which is transferred from the terminal located behind the NAT device to the terminal located outside the NAT device, from the private address of the terminal located behind the NAT device into a public address of the router, change the destination address into the public address of the terminal located outside the NAT device, and transfer the packet to the terminal located outside the NAT device.

A second aspect of the present invention provides a VoIP service system using NAT, comprising: a call server for processing VoIP signaling between a terminal located outside a NAT device and a terminal located behind the NAT device; a media gateway for transferring and receiving a packet associated with a VoIP call between the terminal located outside the NAT device and the terminal located behind the NAT device; and a router for looking up a private address of the call server and a private address of the media gateway in a previously generated NAT table using port information included in a packet transferred while signaling or a call is performed for VoIP service from a terminal located outside the NAT device to a terminal behind the NAT device, and when a packet is transferred through the call server or the media gateway while signaling or a call is performed for VoIP service from the terminal located behind the NAT device to the terminal located outside the NAT device, the router generates an IP conntrack having the private address of the call server or the media gateway as an originating address included in the packet and having a public address of the terminal located outside the NAT device as a destination address.

While performing signaling or a call for VoIP service from the terminal located behind the NAT device to the terminal located outside the NAT device, the router may change the originating address included in the packet transferred through the call server or the media gateway from the private address of the call server or the media gateway into a public address of the router, set the destination address to the public address of the terminal located outside the NAT device, and transfer the packet to the terminal located outside the NAT device.

A third aspect of the present invention provides a method of processing a packet in a VoIP service system using NAT, comprising the steps of: looking up a private address of a terminal located behind a NAT device in a previously generated NAT table using port information included in a packet transferred from a terminal located outside the NAT device to the terminal located behind the NAT device; and when a packet is transferred from the terminal located behind the NAT device to the terminal located outside the NAT device, generating an IP conntrack having the private address of the terminal located behind the NAT device as an originating address and having a public address of the terminal located outside the NAT device as a destination address.

The method may further comprise the step of: changing the originating address of the packet, which is transferred from the terminal located behind the NAT device to the terminal located outside the NAT device, from the private address of the terminal located behind the NAT device into a public address of a router, changing the destination address into the public address of the terminal located outside the NAT device, and transferring the packet to the terminal located outside the NAT device.

A fourth aspect of the present invention provides a method of processing a packet in a VoIP service system using NAT, comprising the steps of: looking up a private address of a call server and a private address of a media gateway in a previously generated NAT table using port information included in a packet transferred while signaling or a call is performed for VoIP service from a terminal located outside a NAT device to a terminal located behind the NAT device; and when a packet is transferred through the call server or the media gateway while signaling or a call is performed for VoIP service from the terminal located behind the NAT device to the terminal located outside the NAT device, generating an IP conntrack having the private address of the call server or the media gateway as an originating address and having a public address of the terminal located outside the NAT device as a destination address.

The method may further comprise the step of: while signaling or a call is performed from the terminal located behind the NAT device to the terminal located outside the NAT device, changing the originating address included in the packet, which is transferred through the call server or the media gateway, from the private address of the call server or the media gateway into a public address of a router, setting the destination address to the public address of the terminal located outside the NAT device, and transferring the packet to the terminal located outside the NAT device.

BRIEF DESCRIPTION OF THE DRAWINGS

A more complete appreciation of the invention, and many of the attendant advantages thereof, will be readily apparent as the same becomes better understood by reference to the following detailed description, when considered in conjunction with the accompanying drawings, in which like reference symbols indicate the same or similar components, wherein:

FIG. 2 illustrates an example of an IP conntrack of a VoIP service system;

FIG. 4 illustrates an example of an IP conntrack of a VoIP service system according to an exemplary embodiment of the present invention;

FIG. 5 illustrates a Wide Area Network (WAN) interface configuration screen of a router according to the present invention;

FIG. 6 illustrates a private IP address configuration screen according to the present invention;

FIG. 8 illustrates an example of a NAPT table according to the present invention.

DETAILED DESCRIPTION OF EXEMPLARY EMBODIMENTS

Figure 1:
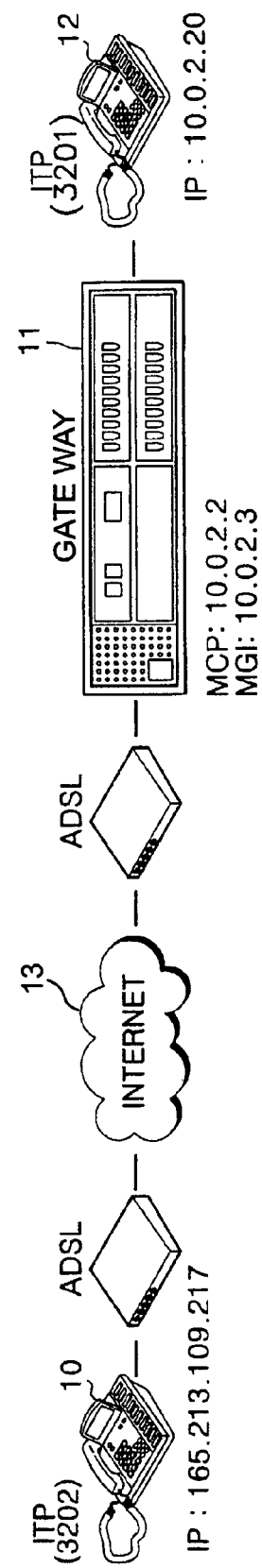
FIG. 1 illustrates a configuration of a network of a Voice over Internet Protocol (VoIP) service system.

Hereinafter, exemplary embodiments of the present invention will be described in detail with reference to the accompanying drawings. In the following description, a detailed description of known functions and configurations incorporated herein has been omitted for conciseness. The following description will be made regarding exemplary embodiments in which the present invention is applied to a Voice over Internet Protocol (VoIP) service system and a method of processing a packet in the system. It should be noted that the following exemplary embodiments are merely to help with understanding the present invention, and thus are not to be interpreted as limiting the scope of the present invention.

In addition, like elements are denoted by like reference numerals throughout the drawings for convenience.

This will be described in detail below with reference to FIGS. 1 and 2.

FIG. 1 illustrates a configuration of a network of a VoIP service system.

As illustrated in FIG. 1, when a packet is transferred from a terminal 10 connected with the Internet 13 to a terminal 12 connected with a gateway 11, the gateway 11 generates an IP conntrack using address information and port information included in the transferred packet to transfer a packet from the terminal 12 to the terminal 10.

The IP conntrack generated in this way is shown in FIG. 2.

As illustrated in FIG. 2, "src=165.213.109.217 dst=165.213.88.194 sport=6000 dport=6000" and "src=165.213.88.194 dst=165.213.109.217 sport=6000 dport=6000" are shown centering around [UNREPLIED], respectively.

Here, "src=165.213.109.217 dst=165.213.88.194 sport=6000 dport=6000" denotes the address of the terminal 10 that is a source address src of the packet transferred from the terminal 10 to the terminal 12, the address of a router in the gateway 11 that is a destination address dst, and a source port sport and a destination port dport for VoIP service call signaling configuration between the terminals 10 and 12.

Meanwhile, "src=165.213.88.194 dst=165.213.109.217 sport=6000 dport=6000" denotes the address of the router in the gateway 11 that is a source address src of a packet to be transferred from the router in the gateway 11 to the terminal 10, the address of the terminal 10 that is a destination address dst, and a source port sport and a destination port dport for VoIP service call signaling configuration between the terminals 12 and 10.

As shown in the IP conntrack of FIG. 2, a packet transmitted from the terminal 10 for VoIP service arrives at the router (165.213.88.194) in the gateway 11, and the router in the gateway 11 looks up a previously generated NAT, or NAPT, table using port information included in the received packet. The NAT, or NAPT, table includes protocol and port information corresponding to a call server, i.e., a Modular Communications Platform (MCP), and a Media Gateway Interface (MGI) for VoIP service between terminals (12) located behind the gateway 11 and terminals (10) connected with the Internet.

Here, for the sake of VoIP service, the Modular Communications Platform (MCP) processes signaling for call connection between the terminals 10 and 12. After signaling for VoIP call connection between the terminals 10 and 12 is finished, the Media Gateway Interface (MGI) processes a Real-time Transport Protocol (RTP) packet transmitted and received between the terminals 10 and 12.

When the port information included in the received packet is in the NAT, or NAPT, table, the router in the gateway 11 provides the packet to a device, i.e., the Modular Communications Platform (MCP) or the Media Gateway Interface (MGI), having an IP address corresponding to the port information.

In other words, as illustrated in FIG. 2, the router in the gateway 11 looks up an Modular Communications Platform (MCP), which has an IP address corresponding to the port information "sport=6000 dport=6000" included in the packet transferred from the terminal 10, in the previously generated NAT, or NAPT, table and provides the packet to the Modular Communications Platform (MCP).

After this, when a packet is transferred from the Modular Communications Platform (MCP) to the terminal 10, the router in the gateway 11 checks the IP conntrack shown in FIG. 2 and obtains information for transferring the packet from the Modular Communications Platform (MCP) to the terminal 10.

However, the router in the gateway 11 cannot transfer the packet from the Modular Communications Platform (MCP) to the terminal 10 because information for transferring the packet from the Modular Communications Platform (MCP) to the terminal 10 is "src=165.213.88.194 dst=165.213.109.217 sport=6000 dport=6000."

In other words, the source address src must be changed from "165.213.88.194" into "10.0.2.2" so that the packet can be transferred from the Modular Communications Platform (MCP) to the terminal 10.

Figure 3:
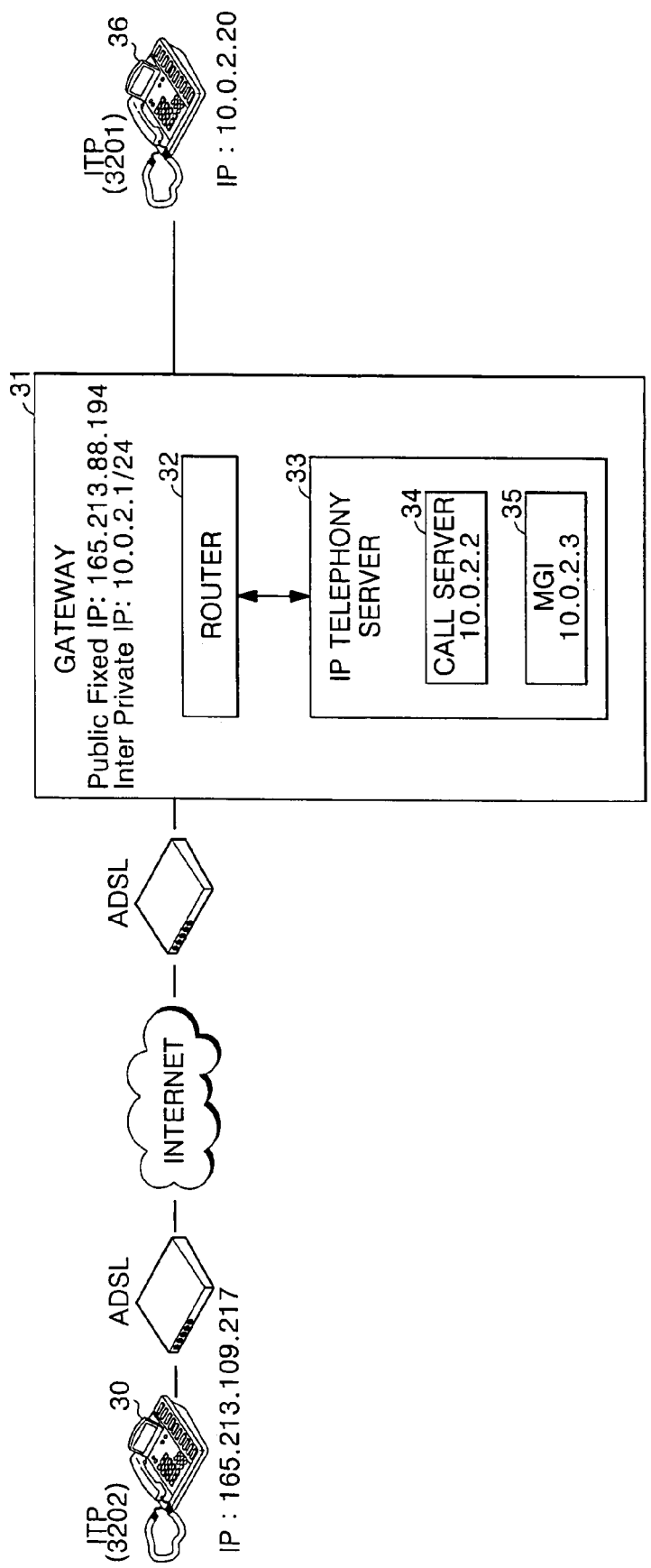
FIG. 3 illustrates a configuration of a network of a VoIP service system according to an exemplary embodiment of the present invention.

FIG. 3 illustrates a configuration of a network of a VoIP service system according to an embodiment of the present invention.

As illustrated in FIG. 3, a gateway 31 is an integrated system including a router 32 and an IP telephony server 33.

The router 32 provides a configuration screen to a terminal (not shown) of an administrator so that a Wide Area Network (WAN) interface to be used by the IP telephony server 33 can be configured to register a terminal 30 located outside the gateway 31 and provide VoIP service.

Figure 5:
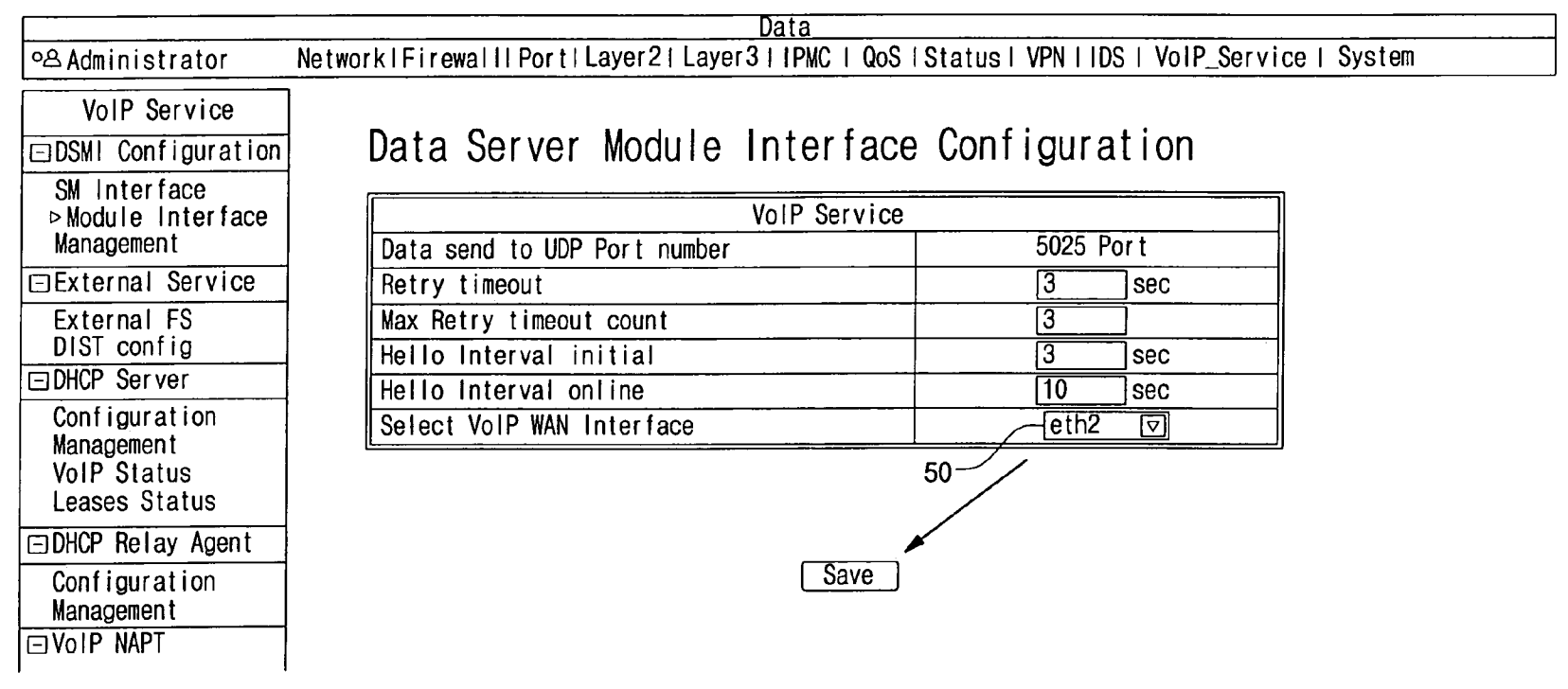

An example of the WAN interface configuration screen to be used by the IP telephony server 33 is illustrated in FIG. 5.

As illustrated in FIG. 5, a WAN interface 50 to be used by the IP telephony server 33 is set to "eth2" by the administrator.

When configuration of the WAN interface to be used by the IP telephony server 33 is finished by the administrator, the router 32 provides a private IP address configuration screen for a call server 34 and a Media Gateway Interface (MGI) 35 in the IP telephony server 33 to the terminal of the administrator.

An example of such a private IP address configuration screen is illustrated in FIG. 6.

As illustrated in FIG. 6, the private IP address 60 of the call server 34 in the IP telephony server 33 is set to "10.0.2.2," and the private IP address 61 of the Media Gateway Interface (MGI) 35 is set to "10.0.2.3."

After the private IP address configuration for the call server 34 and the Media Gateway Interface (MGI) 35 is finished, the router 32 generates a Network Address Ports Translation (NAPT) table for VoIP service through Inter-Process Communication (IPC) with the call server 34.

This will be described below with reference to FIGS. 7A and 7B.

Figure 7A:
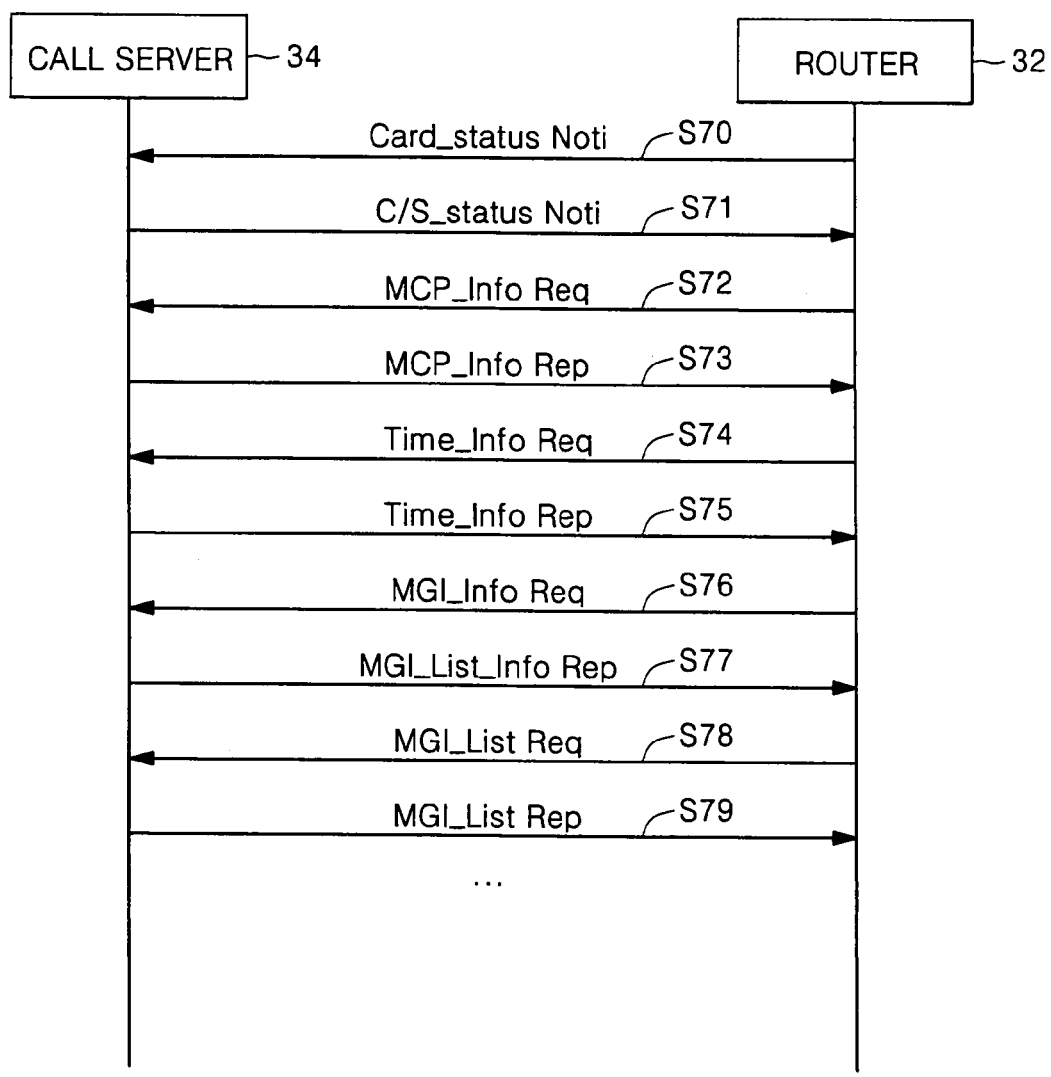
FIGS. 7A and 7B show signal flows for generating a Network Address Port Translation (NAPT) table according to the present invention.

As illustrated in FIG. 7A, the router 32 provides a status message Card_status Noti to the call server 34 to determine whether or not the call server 34 is installed in the IP telephony server 33 (step S70).

In response to the status message, the call server 34 generates a status reply message C/S_status Noti and provides the generated status reply message to the router 32 (step S71).

When the status reply message is received from the call server 34, the router 32 provides a call server information request message MCP_Info Req to the call server 34 to request private network information for VoIP service (step S72).

In response to the call server information request message, the call server 34 provides the router 32 with a call server information reply message MCP_Info Rep including the stored private IP address of the call server 34 and numeral information of terminals connected with the gateway 31 (step S73).

The router 32 stores information included in the call server information reply message and provides a synchronization request message Time_Info Req including time information to the call server 34 for synchronization with the call server 34 (step S74).

The call server 34 performs synchronization with the router 32 according to the time information included in the synchronization request message, and when the synchronization is finished, provides a synchronization reply message Time_Info Rep to the router 32 (step S75).

When the time synchronization reply message is received from the call server 34, the router 32 provides an MGI list request message MGI_Info Req to the call server 34 to obtain a list of Media Gateway Interfaces (MGIs) processing a Real-time Transport Protocol (RTP) packet including voice data during VoIP service (step S76).

In response to the MGI list request message, the call server 34 includes MGI list information in an MGI list reply message MGI_List_Info Rep and provides the MGI list reply message to the router 32 (step S77).

The router 32 provides an MGI address information request message MGI_List Req to the call server 34 to obtain IP address information of the Media Gateway Interfaces (MGIs) included in the MGI list information (step S78).

In response to the MGI address information request message, the call server 34 includes the IP address information of the Media Gateway Interfaces (MGIs) included in the MGI list in an MGI address information reply message MGI_List Rep and provides the MGI address information reply message to the router 32 (step S79).

As described above, FIG. 7A shows flow of messages processed when the router 32 requests, from the call server 34, information used to generate a NAT table required for VoIP service.

Figure 7B:
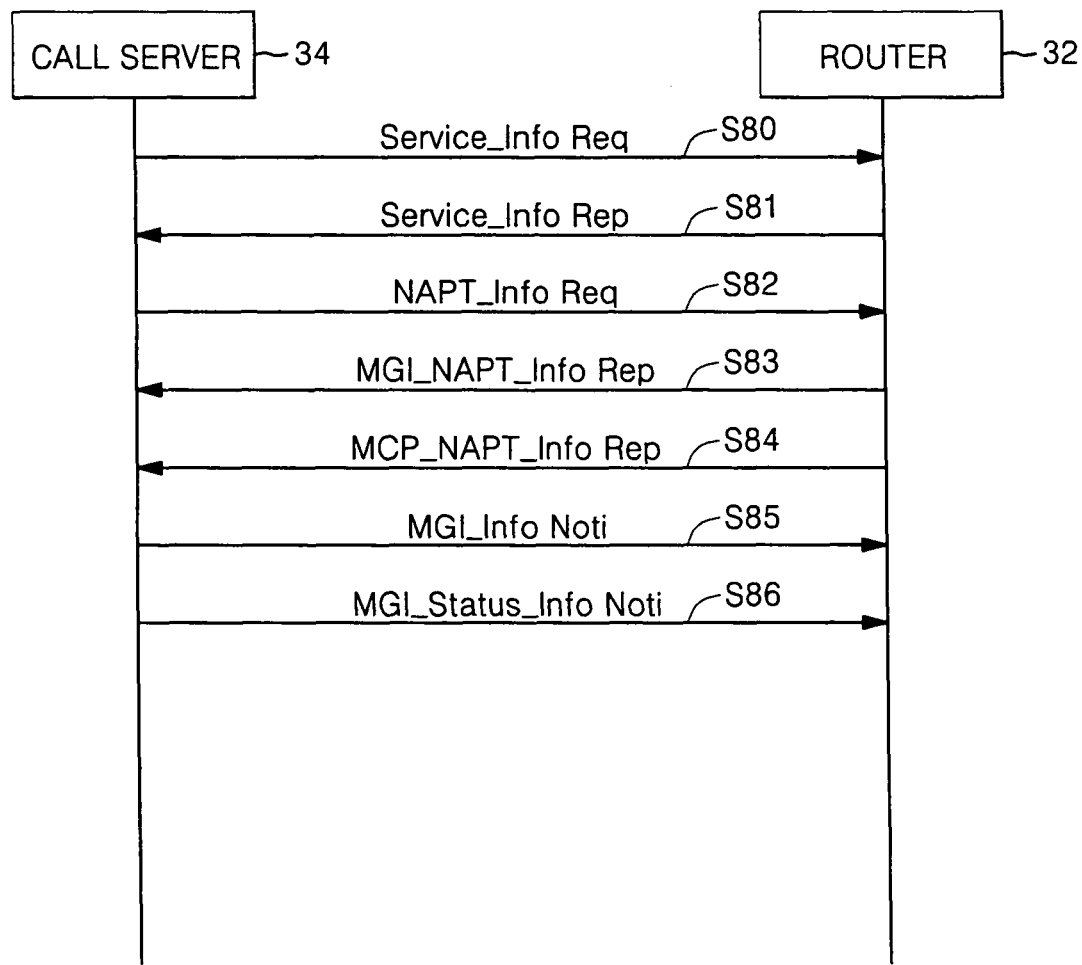

Meanwhile, FIG. 7B shows flow of messages processed when the call server 34 requests, from the router 32, information used to generate a NAT table required for VoIP service.

As shown in FIG. 7B, the call server 34 provides a service information request message Service_Info Req to the router 32 for requesting the public IP address of the router 32 (step S80).

In response to the service information request message, the router 32 includes its own public IP address in a service information reply message Service_Info Rep and provides the service information reply message to the call server 34 (step S81).

The call server 34 stores the public IP address of the router 32 included in the service information reply message, and provides a port information setup request message NAPT_Info Req to the router 32 to set up port information for the Media Gateway Interfaces (MGIs) included in the MGI list (step S82).

In response to the port information setup request message, the router 32 sets up ports for the Media Gateway Interfaces (MGIs), includes information on the ports in an MGI port information setup reply message MGI_NAPT_Info Rep, and provides the MGI port information setup reply message to the call server 34 (step S83).

After providing the MGI port information setup reply message, the router 32 sets up a port for the call server 34, includes information on the port in a call server port information setup reply message MCP_NAPT_Info Rep, and provides the call server port information setup reply message to the call server 34 (step S84).

The call server 34 stores respective pieces of the port information, which are included in the MGI port information setup reply message and the call server port information setup reply message, to correspond to the addresses of the Media Gateway Interfaces (MGIs) and the call server 34, and provides an MGI information message MGI_Info Noti including the address information and the port information of the Media Gateway Interfaces (MGIs) to the router 32 (step S85).

After providing the MGI information message to the router 32, the call server 34 determines whether or not the Media Gateway Interfaces (MGIs) are in a normal status, includes the determined information about whether or not the Media Gateway Interfaces (MGIs) are in the normal status in an MGI status information message MGI_Staus_Info Noti, and provides the MGI status information message to the router 32 (step S86).

When the information about whether or not the Media Gateway Interfaces (MGIs) are in the normal status is provided, the router 32 generates a NAPT table using information obtained through steps 70 to 86.

An example of the NAPT table generated in this way is illustrated in FIG. 8.

As illustrated in FIG. 8, the NAPT table includes a type of protocol, i.e., Transmission Control Protocol (TCP) or User Datagram Protocol (UDP), and a destination port dpt in the column of destination address (destination).

For example, a type of protocol "udp" and the destination port dpt "30000:30031" are set for a destination address "10.0.0.3."

When a packet for VoIP call connection to a terminal 36 (FIG. 3) is received from the terminal 30 connected with the Internet after the NAPT table is generated, the router 32 generates an IP conntrack using address information and port information included in the received packet to transfer the packet from the terminal 30 to the terminal 36.

The IP conntrack generated in this way is illustrated in FIG. 4.

As illustrated in FIG. 4, the IP conntrack is "src=165.213.109.217 dst=165.213.88.194 sport=6000 dport=6000 src=10.0.2.2 dst=165.213.109.217 sport=6000 dport=6000 [ASSURED] use=1."

Here, "src=165.213.109.217 dst=165.213.88.194 sport=6000 dport=6000" denotes the address of the terminal 30 that is a source address src of the packet transferred from the terminal 30 to the terminal 36, the address of the router 32 that is a destination address dst of the packet, and a source port sport "6000" and a destination port dport "6000" for VoIP service call signaling configuration between the terminals 30 and 36.

Meanwhile, "src=10.0.2.2 dst=165.213.109.217 sport=6000 dport=6000" denotes the address of the router 32 that is a source address src of a packet to be transferred from the router 32 to the call server 34, the address of the call sever 34 that is a destination address dst of the packet, and a source port sport "6000" and a destination port dport "6000" for VoIP service call signaling configuration between the terminals 30 and 36.

As shown in the IP conntrack of FIG. 4, the packet transferred from the terminal 30 for VoIP service arrives at the router 32 in the gateway 31, and the router 32 in the gateway 31 looks up the previously generated NAPT table using the port information included in the arrived packet. Here, the NAT, or NAPT, table includes protocol and port information corresponding to the IP addresses of the call server 34 and the Media Gateway Interface (MGI) 35 for VoIP service between terminals (36) located behind the gateway 31 and terminals (30) connected with the Internet. An example of such a NAPT table is illustrated in FIG. 8.

When the port information included in the arrived packet exists in the NAT, or NAPT, table shown in FIG. 8, the router 32 in the gateway 31 provides the packet to a device, i.e., the call server 34 or the Media Gateway Interface (MGI) 35, having an IP address corresponding to the port information.

In other words, as illustrated in FIG. 4, the router 32 in the gateway 31 looks up the call server 34, which has an IP address corresponding to the port information "sport=6000 dport=6000" included in the packet transferred from the terminal 30, in the NAPT table shown in FIG. 8, and provides the packet to the call server 34.

Subsequently, when a packet to be transferred from the terminal 36 to the terminal 30 for VoIP call signaling is transferred through the call server 34, the router 32 changes the address of the call server 34 that is an originating address with the public address of the router 32 and transfers the packet to the terminal 30.

The above description has been made on an IP conntrack associated with the call server 34 and is likewise applied to an IP conntrack associated with the Media Gateway Interface (MGI) 35.

In the same way, the above description is applied to a case in which a terminal is directly connected with the gateway 31 with neither the call server 34 nor the Media Gateway Interface (MGI) 35.

A difference between the IP conntrack shown in FIG. 2 and the IP conntrack shown in FIG. 4 will be described now.

In the IP conntrack shown in FIG. 4, the source address src of a packet to be transferred from the call server 34 to the terminal 30 connected with the Internet is the IP address of the call server 34. In the IP conntrack shown in FIG. 2, however, the source address src of a packet to be transferred from a Modular Communications Platform (MCP) to the terminal 10 connected with the Internet is the IP address of a router in the gateway 11.

Therefore, the packet is normally transferred from the call server 34 to the terminal 30 connected with the Internet according to the IP conntrack shown in FIG. 4, but the packet is not transferred from the Modular Communications Platform (MCP) to the terminal 10 connected with the Internet according to the IP conntrack shown in FIG. 2.

As described above, according to the VoIP service system and method of the present invention, the private address of a terminal located behind a NAT device is looked up in a previously generated NAT table using port information included in a packet transferred from a terminal located outside the NAT device to the terminal located behind the NAT device. When a packet is transferred from the terminal located behind the NAT device to the terminal located outside the NAT device, an IP conntrack is generated which has the private address of the terminal located behind the NAT device as an originating address and a public address of the terminal located outside the NAT device as a destination address, and then the packet is transmitted and received between the terminal located outside the NAT device and the terminal located behind the NAT device. Consequently, the packet for VoIP service is normally transferred from the terminal located behind the NAT device to the terminal located outside the NAT device by the IP conntrack generated when the packet is transferred between the terminal located outside the NAT device and the terminal located behind the NAT device.

While the present invention has been described with reference to exemplary embodiments thereof, it will be understood by those skilled in the art that various changes in from and detail may be made therein without departing from the scope of the present invention as defined by the following claims.

What is claimed is:

1. A Voice over Internet Protocol (VoIP) service system using Network Address Translation (NAT), comprising:
a router to receive a call connection request from a first terminal connected to the Internet to a second terminal to look up a NAT table using port information in a packet transferred from the first terminal, and to determine a private address of the second terminal connected to a gateway using port information in a first packet transferred from the first terminal to the second terminal, the gateway comprising a call server and the NAT table comprising port information corresponding to the call server,
wherein the router is configured to send a request message and the call server is configured to provide a private IP address of the call server to the router,
wherein, in response to a second packet being transferred from the second terminal to the first terminal and a previously generated value stored in the NAT table, the router is configured to generate an IP conntrack comprising a private IP address of the call server as a source address and an address of the first terminal as a destination address, and wherein a source address of the second packet is changed from the private IP address of the call server to a public address of the router.

2. The VoIP service system of claim 1, wherein the router is configured to change the source address of the second packet from the private IP address of the call server to the public address of the router, to set the public address of the first terminal as the destination address, and to transfer the second packet to the first terminal.

3. The VoIP service system of claim 1, wherein:
the router is configured to send a synchronization request message comprising time information to the call server for synchronization with the call server; and
the call server is configured to perform synchronization with the router according to the time information in the synchronization request message.

4. The VoIP service system of claim 3, wherein:
upon detection of the synchronization, the router is configured to provide an Media Gateway Interfaces (MGIs) list request message to the call server to process a Real-time Transport Protocol (RTP) packet comprising voice data during VoIP service.

5. The VoIP service system of claim 4, wherein:
the call server is configured to store a public IP address of the router, and to provide a port information setup request message to the router to set up port information of the Media Gateway Interfaces (MGIs) in the MGI list.

6. The VoIP service system of claim 5, wherein:
the call server is configured to store the port information of the Media Gateway Interfaces (MGIs) and port information for the call server, and to provide, to the router, an MGI information message comprising address information and the port information of the Media Gateway Interfaces (MGIs).

7. A Voice over Internet Protocol (VoIP) service system using Network Address Translation (NAT), the system comprising:
a call server to process VoIP signaling between a terminal located outside a NAT device and a terminal located behind the NAT device;
a media gateway to transfer a packet associated with a VoIP call between the terminal located outside the NAT device and the terminal located behind the NAT device; and
a router to look up a NAT table using port information in a packet transferred from the terminal located outside the NAT device, the NAT table comprising port information corresponding to the call server, and to send a request message to the call server to determine a private address of the call server and a private address of the media gateway using port information in the packet transferred from the terminal located outside the NAT device to the terminal located behind the NAT device,
wherein, in response to the packet being transferred through the call server between the terminal located behind the NAT device and the terminal located outside the NAT device and a previously generated value stored in the NAT table, the router generates an IP conntrack comprising a private IP address of the call server as a source address and an address of the terminal located outside the NAT device as a destination address, and
wherein a source address of the packet is changed from the private IP address of the call server to a public address of the router.

8. The VoIP service system of claim 7, wherein while performing signaling or a call for VoIP service from the terminal located behind the NAT device to the terminal located outside the NAT device, the router is configured to change the source address from the private IP address of the call server to the public address of the router, to set the public address of the terminal located outside the NAT device as the destination address, and to transfer the packet to the terminal located outside the NAT device.

9. A method of processing a packet in a Voice over Internet Protocol (VoIP) service system using Network Address Translation (NAT), the method comprising:
- determining a private address of a terminal located behind a NAT device using port information in a packet transferred between a terminal located outside the NAT device and the terminal located behind the NAT device, the NAT device comprising a call server and a router, the router being configured to look up a NAT table using port information in a packet transferred from the terminal located outside the NAT device, the NAT table comprising port information corresponding to the call server, and to send a request message and the call server being configured to provide a private IP address of the call server to the router; and
- in response to the packet being transferred between the terminal located behind the NAT device and the terminal located outside the NAT device and a previously generated value stored in the NAT table, generating an IP conntrack comprising a private IP address of the call server as a source address and an address of the terminal located outside the NAT device as a destination address,
- wherein a source address of the packet is changed from the private IP address of the call server to a public address of the router.

10. The method of claim 9, further comprising:
- transferring the packet from the terminal located behind the NAT device to the terminal located outside the NAT device.

11. A method of processing a packet in a Voice over Internet Protocol (VoIP) service system using Network Address Translation (NAT), comprising:
- sending a message by a router to a call server and determining a private address of the call server using port information in a packet transferred between a terminal located outside a NAT device and a terminal located behind the NAT device, the router being configured to look UP a NAT table using port information in a packet transferred from the terminal located outside a NAT device, the NAT table including port information corresponding to the call server; and
- in response to the packet being transferred through the call server between the terminal located behind the NAT device and the terminal located outside the NAT device and a previously generated value stored in the NAT table, generating an IP conntrack comprising a private IP address of the call server as a source address and an address of the terminal located outside the NAT device as a destination address,
- wherein a source address of the packet is changed from the private IP address of the call server to a public address of the router.

12. The method of claim 11, further comprising:
- transferring the packet from the terminal located behind the NAT device to the terminal located outside the NAT device.

* * * * *